W. G. HOLLOWELL.
VEHICLE WRENCH.
APPLICATION FILED MAR. 15, 1911.
1,006,216.
Patented Oct. 17, 1911.
2 SHEETS—SHEET 1.
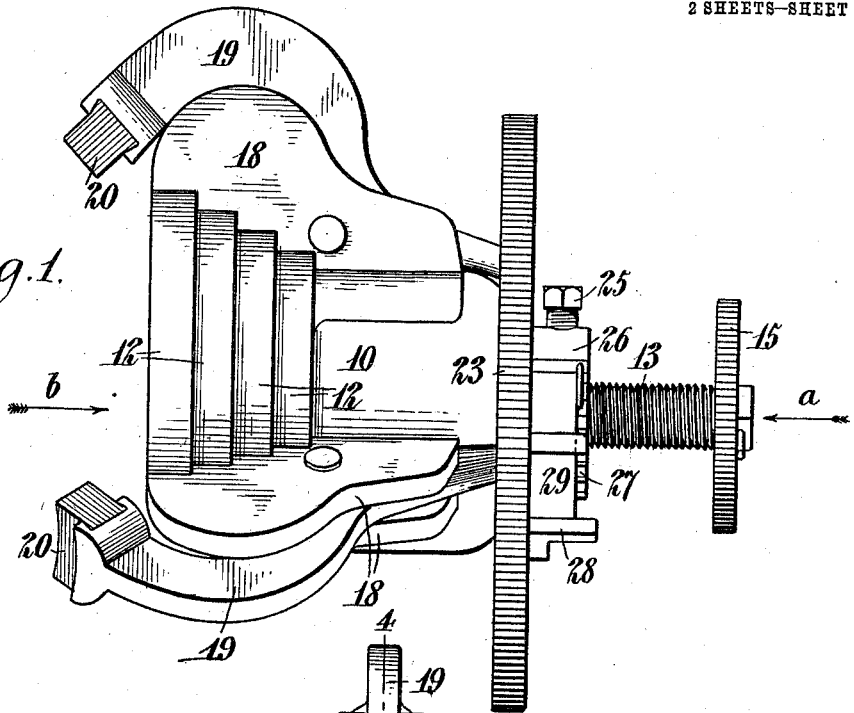
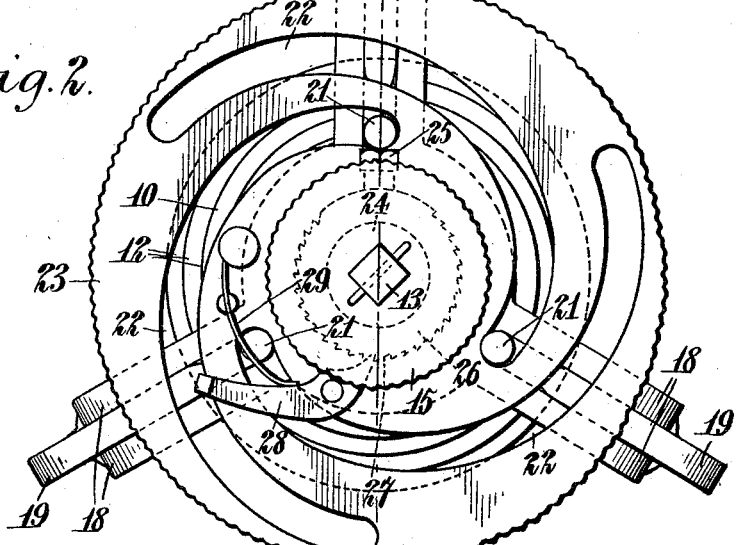
Witnesses:
Christ Feinle, Jr.
F. A. Hoeter
Inventor,
William G. Hollowell.
By Victor J. Evans,
Attorney.

W. G. HOLLOWELL.
VEHICLE WRENCH.
APPLICATION FILED MAR. 15, 1911.
1,006,216.
Patented Oct. 17, 1911.
2 SHEETS—SHEET 2.
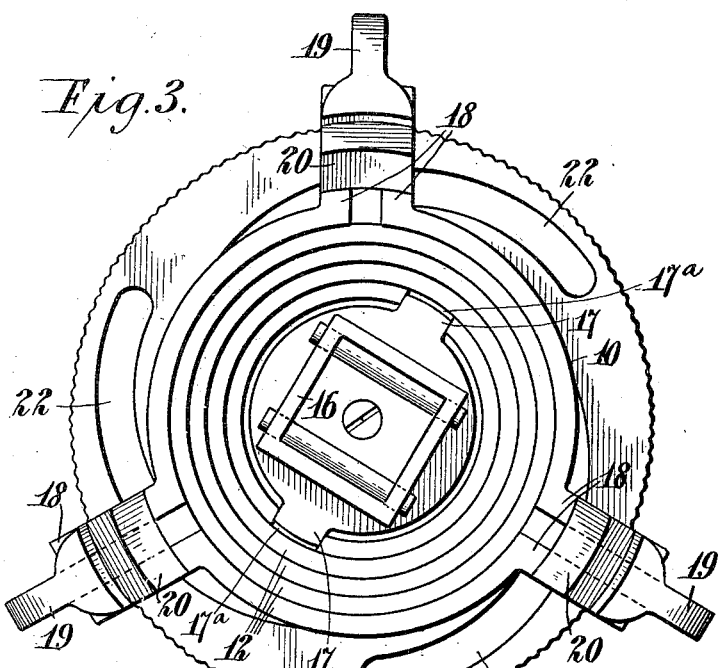
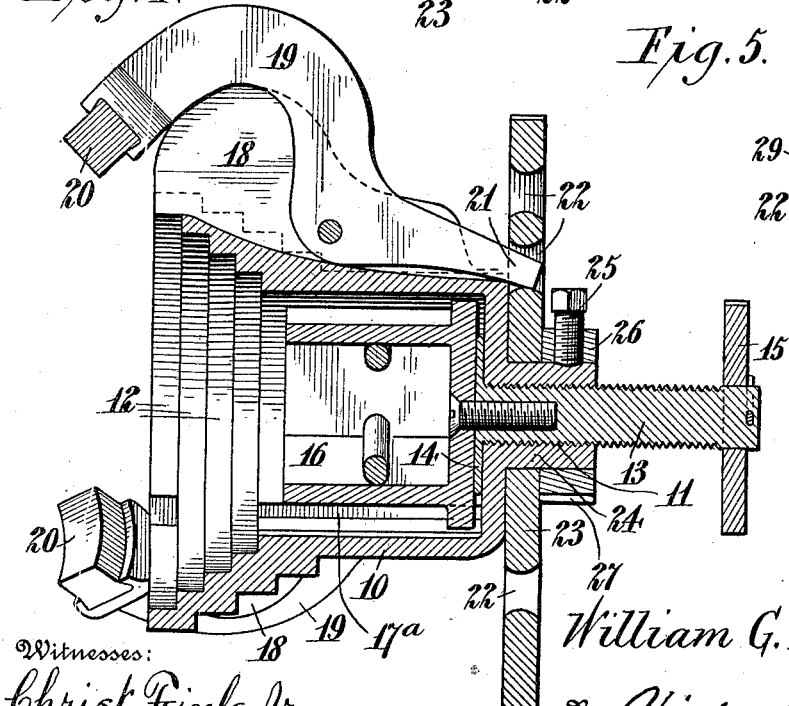
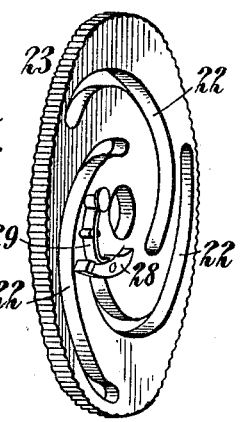
Witnesses:
Christ Feinle, Jr.
P. G. Hoster
Inventor,
William G. Hollowell.
By Victor J. Evans,
Attorney.
COLUMBIA PLANOGRAPH CO., WASHINGTON, D. C.

UNITED STATES PATENT OFFICE.

WILLIAM G. HOLLOWELL, OF GOLDSBORO, NORTH CAROLINA.

VEHICLE-WRENCH.

1,006,216.  Specification of Letters Patent.  Patented Oct. 17, 1911.

Application filed March 15, 1911.  Serial No. 614,659.

*To all whom it may concern:*

Be it known that I, WILLIAM G. HOLLOWELL, a citizen of the United States, residing at Goldsboro, in the county of Wayne and State of North Carolina, have invented new and useful Improvements in Vehicle-Wrenches, of which the following is a specification.

An object of the invention is to provide a wrench, particularly adapted for use on vehicles, to remove a nut from the axle of the vehicle, the said nut being adapted to normally position the vehicle wheel on the axle, and the said nut being so removable from the axle that the same can be quickly and easily replaced thereon.

Among other features, my invention embodies a body portion having an end thereof provided with grooves of different diameters so that the said end can be fitted to the hubs of different sized vehicle wheels, a plurality of clamping hooks pivotally mounted on the said body and adapted to clamp the hub of the wheel to the body, a cam mounted on the body and adapted to operate the said clamping hooks to move the same into engagement with the hub and a square jaw adapted for engagement with the nut on the axle of the vehicle so that when the vehicle wheel is rotated in a direction reversely to the usual forward rotation of the wheel, the nut will be removed from the axle and held by the said jaw, the entire wrench being clamped to the vehicle wheel when the same is removed from the axle.

Reference is to be had to the accompanying drawings constituting a part of this specification, in which similar characters of reference denote corresponding parts in all the views, and in which—

Figure 1 is a side elevation of my device. Fig. 2 is an end view looking in the direction of the arrow *a* in Fig. 1. Fig. 3 is an end view looking in the direction of the arrow *b* in Fig. 1. Fig. 4 is a longitudinal sectional view taken on the line 4—4 in Fig. 2. Fig. 5 is a perspective view of the cam member adapted to operate the clamping hooks to engage the hub of the vehicle wheel.

Referring more particularly to the views, I employ a body 10, constituting a casing and provided with a threaded hole 11, a plurality of grooves 12 of different diameters being formed at one end of the body 10. A threaded shank 13 is provided to threadedly operate in the threaded hole of the body 10, the said shank being provided at one end with a laterally extending flange 14 and having the other end thereof adapted to receive a knurled handle or operating wheel 15. Secured to the shank 13 is a jaw 16 adapted to fit over the nut of a vehicle axle and the said jaw is provided with flanges 17 movable in grooves 17ª formed on the inner seat of the body 10 as will be seen in Fig. 4. The body 10 is provided with a series of pairs of laterally extending bearings 18, and pivotally mounted in the said bearings are clamping hooks 19 having their clamping ends preferably provided with suitable rubber pads 20, the other ends of the said clamping hooks terminating in rounded portions 21 movable in clamping grooves 22 formed on a cam member 23 mounted to turn on a bearing 24 formed at one end of the body 10. Secured to the bearing 24 by means of a set screw 25 is a collar 26 provided with a series of teeth 27 adapted to be engaged by a pawl 28 pivotally mounted on the cam 23, the said pawl 28 being actuated by a suitable spring 29 secured to the cam member 23 and engaging the pawl 28. As will be seen by referring to Fig. 2, the rounded ends of the clamping hooks 19 are movable in cam slots of the cam member 23, the said slots extending inwardly on the cam member from the outer edge thereof so that when the cam member is turned relatively to the body 10 the clamping hooks will be actuated so that their clamping ends will move inwardly.

When it is desired to remove a wheel from the axle of a vehicle, the vehicle wrench is applied to the wheel of the vehicle so that the outer peripheral edge of the hub will fit in one of the grooves of the body member and by operating the cam member 23, the clamping hooks will be moved inwardly so that their clamping ends will be clamped to the hub of the wheel. The operating wheel 15 is then actuated to move the jaw of the wrench into contact with the nut on the vehicle axle and then by turning the vehicle wheel rearwardly the nut will be disengaged from the axle of the vehicle and the said nut, together with the vehicle wheel, securely clamped to my wrench, can be removed from the vehicle axle so that the said axle can be greased or lubricated in the usual manner.

When the wheel is to be returned to the vehicle axle, the said wheel, together with my wrench clamped thereto, and having the nut of the axle held by the jaw of my wrench, is moved into engagement with the vehicle axle and the wheel is rotated in a forward direction, thus reëstablishing the nut and the wheel in proper position on the vehicle axle. It will be readily seen that the threads on the nut will easily contact with the threads on the vehicle axle inasmuch as the wheel, clamped to my wrench, acts as a means for properly alining the nut with respect to the vehicle axle when the said nut engages the outer ends of the axle. The pawl engaging the toothed collar of my device is adapted to prevent the clamping hooks from being disengaged from the hub of the vehicle wheel after the same have been clamped thereto, the said clamping hooks being only releasable from the said hub when the pawl is moved out of engagement with the toothed collar so that the cam member 23 can be rotated, thus releasing the clamping hooks from engagement with the hub of the vehicle wheel.

Having thus fully described the invention, what I claim as new, is:—

1. A vehicle wrench comprising a body member provided at one end with a plurality of grooves, of different diameters, the said grooves being adapted to receive the outer peripheral edge of the hub of the vehicle wheel, clamping hooks pivotally mounted on the said body and adapted to engage the hub of the wheel, a cam member mounted to turn on the said body and provided with cam slots adapted to receive the inner ends of the said clamping hooks so that when the said cam member is operated the clamping hooks will be moved into engagement with the hub of the wheel, a toothed collar secured to the said body, a ratchet mounted on the said cam member and adapted to engage the said toothed collar to releasably hold the clamping hooks in engagement with the hub of the wheel, a jaw mounted to slide in the said body and adapted to engage the nut of the vehicle axle and means mounted on the said body for operating the said jaw relatively to the said body to engage the said jaw with the nut of the vehicle axle.

2. A vehicle wrench comprising a body, a plurality of clamping hooks mounted on the said body and adapted to engage the hub of a vehicle wheel, a jaw mounted on the said body and movable thereon to engage the nut of the vehicle axle, a cam member turnably mounted on the said body for operating the said clamping hooks to engage the hub of the vehicle wheel, a toothed collar secured to the said body and a pawl mounted on the said cam member and engaging the said toothed collar for locking the said clamping hooks relatively to the hub of the vehicle wheel.

3. In a vehicle wrench the combination of a body provided with a series of grooves of different diameters, the said grooves being adapted to receive the peripheral outer end of the hub of the vehicle wheel, a plurality of clamping hooks mounted on the said body and having their clamping ends adapted to engage the hub of the vehicle wheel, a shank threadedly mounted in the said body and extending longitudinally thereof, a jaw secured to the said shank, a plurality of laterally extending flanges integrally formed on the said jaw and slidable in grooves formed on the inner side of the said body, an operating wheel secured to the said shaft for moving the said jaw to engage the nut of a vehicle axle, a cam member mounted on the said body and provided with a plurality of cam slots having the inner ends of the clamping hooks movable therein so that when the said cam member is operated the said clamping hooks will be moved to engage the hub of the vehicle wheel, a collar secured to the said body between the said operating wheel and the said cam member thereof, a series of teeth formed on the said collar, and a spring-controlled pawl mounted on the said cam member and adapted to engage the teeth of the said collar to releasably lock the clamping hooks relatively to the hub of the vehicle wheel.

4. A vehicle wrench comprising a body, a plurality of clamping hooks mounted on the said body and adapted to engage the hub of a vehicle wheel, a jaw mounted on the said body and movable thereon to engage the nut of the vehicle axle, a cam member mounted on the said body for operating the said clamping hooks to engage the hub of the vehicle wheel, a toothed collar secured to the said body and means mounted on the said cam member and engaging the said toothed collar for locking the clamping hooks relatively to the hub of the vehicle wheel.

In testimony whereof I affix my signature in presence of two witnesses.

WILLIAM G. HOLLOWELL.

Witnesses:
JOHN R. CRAWFORD,
H. C. SMITH.

---

Copies of this patent may be obtained for five cents each, by addressing the "Commissioner of Patents, Washington, D. C."